United States Patent [19]
Kunihira et al.

[11] Patent Number: 5,444,581
[45] Date of Patent: Aug. 22, 1995

[54] ROTARY HEAD FOR USE IN A MAGNETIC RECORDIANG AND REPRODUCING APPARATUS WIHICH INCLUDES HEIGHT ADJUSTER

[75] Inventors: Tadashi Kunihira, Osaka; Yoshifumi Yanagawa, Kyoto, both of Japan

[73] Assignee: Matsushita Electric Industrial Co., Ltd., Osaka, Japan

[21] Appl. No.: 350,153

[22] Filed: Nov. 29, 1994

Related U.S. Application Data

[63] Continuation of Ser. No. 169,964, Dec. 20, 1993, abandoned, which is a continuation of Ser. No. 768,019, Sep. 30, 1991, abandoned.

[30] Foreign Application Priority Data

Sep. 28, 1990 [JP] Japan ................................. 2-260892
Jun. 17, 1991 [JP] Japan ................................. 3-144443

[51] Int. Cl.⁶ ........................... G11B 5/56; G11B 21/02
[52] U.S. Cl. ..................... 360/75; 360/109; 360/108; 360/84
[58] Field of Search .......... 360/77.16, 75, 84, 73.11, 360/109, 110, 104, 107, 108, 77.12, 77.13; 369/97, 44.17, 4418

[56] References Cited

U.S. PATENT DOCUMENTS

| | | | |
|---|---|---|---|
| 4,117,519 | 9/1978 | Shioyama et al. | 360/84 |
| 4,203,140 | 5/1980 | Watanabe | 360/109 |
| 4,335,408 | 6/1982 | Dinter | 360/77.16 |
| 4,366,515 | 12/1982 | Takano et al. | 360/109 |
| 4,564,876 | 1/1986 | Takahashi et al. | 360/77.16 |
| 4,768,117 | 8/1988 | Mihara | 360/104 |
| 4,970,611 | 11/1990 | Kodama et al. | 360/77.16 |
| 5,063,555 | 11/1991 | Miyoshi et al. | 369/44.17 |

FOREIGN PATENT DOCUMENTS

| | | |
|---|---|---|
| 0037715 | 10/1981 | European Pat. Off. . |
| 0368497 | 5/1990 | European Pat. Off. . |
| 56-138374 | 10/1981 | Japan . |
| 61-267918 | 11/1986 | Japan . |
| 2067793 | 7/1981 | United Kingdom . |
| 2219429 | 12/1989 | United Kingdom . |

*Primary Examiner*—Georgia Y. Epps
*Assistant Examiner*—Nabil Hindi
*Attorney, Agent, or Firm*—Wenderoth, Lind & Ponack

[57] ABSTRACT

A rotary head for use in a magnetic recording and reproducing apparatus includes a fixed cylinder, a rotary cylinder opposed to the fixed cylinder, two electrically controllable movable elements mounted on the rotary cylinder so as to be 180° apart from each other, at least two magnetic heads secured to the movable elements, respectively, at least one reference surface provided on the rotary cylinder, and a vertical position detector element for detecting the vertical position of the movable elements and that of the reference surface. The rotary head further includes a control system for controlling the movable elements in response to an output from the vertical position detector element so that the magnetic heads may be located at a predetermined vertical position with respect to the vertical position of the reference surface.

13 Claims, 5 Drawing Sheets

5,444,581

ROTARY HEAD FOR USE IN A MAGNETIC RECORDIANG AND REPRODUCING APPARATUS WIHICH INCLUDES HEIGHT ADJUSTER

This application is a continuation of now abandoned application Ser. No. 08/169,964, filed Dec. 20, 1993, which in turn is a continuation of now abandoned application Ser. No. 07/768,019, filed Sep. 30, 1991 both now abandoned.

BACKGROUND OF THE INVENTION

Field of the Invention

The present invention relates generally to a rotary head type recording and reproducing apparatus, and more particularly to a rotary head for a magnetic recording and reproducing apparatus in which recording and reproduction are performed by the use of magnetic heads which are mounted on respective movable elements so that the level or vertical position thereof can be adjusted.

Description of the Prior Art

Japanese Laid-open Patent Application (unexamined) No. 56-138374 discloses a magnetic reproducing apparatus in which, during a trick reproduction such as, for example, a slow-motion reproduction or a quick-traverse reproduction or the like, a movable element mounted on a rotary cylinder is controlled to make a reproduction head mounted thereon trace recording tracks for reproduction of images having no noise.

In the above-described construction, it is possible to adjust the vertical position of the magnetic head during reproduction so that the magnetic head mounted on the movable element may trace the recording tracks based upon reproduction output levels of video signals, pilot signals or the like recorded on a magnetic tape. However, it is impossible to obtain from the magnetic tape signals required to perform the vertical position control for the magnetic head. Accordingly, it is impossible to perform the proper vertical positioning of the magnetic head with respect to the recording tracks, and therefore, it is difficult to correct the vertical positional deviation of the magnetic head caused by deterioration of the movable element with age or the like. As a result, there arises a problem in that a magnetic head mounted on a movable element does not effectively function during the recording which requires the highly accurate vertical positioning for the magnetic head to adapt it to a recording format.

SUMMARY OF THE INVENTION

The present invention has been developed to overcome the above-described disadvantage.

It is accordingly an object of the present invention to provide an improved rotary head capable of performing recording and reproduction by the use of magnetic heads mounted on respective movable elements so that the level or vertical position thereof can be adjusted.

In accomplishing this and other objects, a rotary head according to the present invention includes a fixed cylinder, a rotary cylinder opposed to the fixed cylinder, two electrically controllable movable elements mounted on the rotary cylinder so as to be 180° apart from each other, at least two magnetic heads secured to the movable elements, respectively, and at least one reference surface provided on the rotary cylinder. The rotary head further includes a vertical position detector means for detecting the vertical positions of the movable elements and that of the reference surface and control means for controlling the vertical positions of the movable elements in response to an output from the vertical position detector means so that the vertical positions of the magnetic heads may be located appropriately with respect to the vertical position of the reference surface.

In the above-described construction, the vertical positional deviation of the magnetic heads caused by the movable elements is corrected by the use of the reference surface and the vertical position detector means so that signals may be appropriately recorded on a recording medium.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and wherein:

FIG. 2, according to the third embodiment of the present invention.

DETAILED DESCRIPTION OF THE PREFERRED EMBODIMENTS

Figure 1:
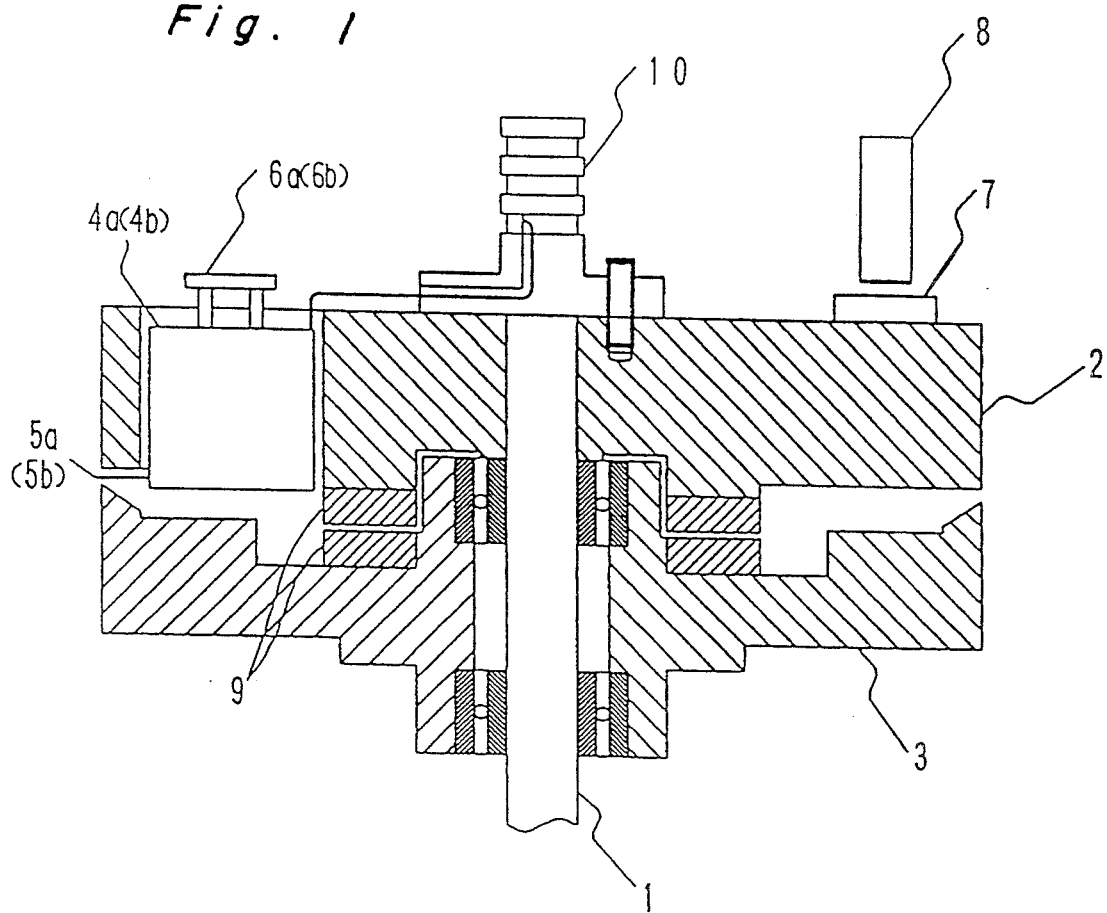
FIG. 1 is a sectional view of a rotary head according to a first embodiment of the present invention.
Figure 2:
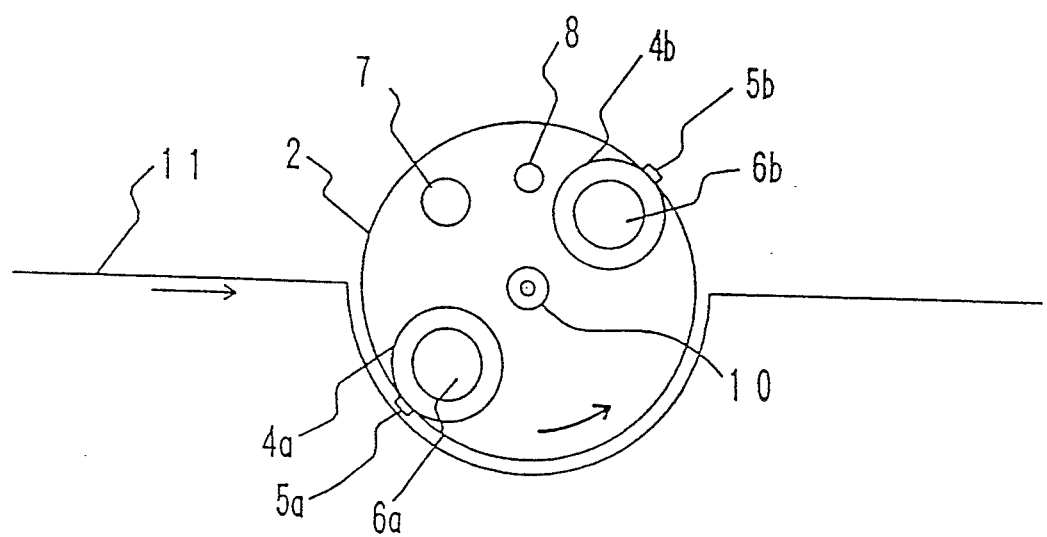
FIG. 2 is a top plan view of the rotary head of FIG. 1.

Referring now to the drawings, there is shown in FIGS. 1 and 2 a rotary head for use in a magnetic recording and reproducing apparatus according to a first embodiment of the present invention.

The rotary head comprises a rotary shaft 1, a rotary cylinder 2 secured to the rotary shaft 1, a fixed cylinder 3 opposed to the rotary cylinder 2, and two movable elements 4a and 4b accommodated in respective recesses formed in the rotary cylinder 2 so as to be about 180° apart form each other. Each of the movable elements 4a and 4b shown in the figures is a moving coil type actuator. The rotary head also comprises two magnetic heads 5a and 5b secured to respective movable elements 4a and 4b and two detection objects 6a and 6b mounted on the movable elements 4a and 4b, respectively, so as to be movable in association with the movement of respective magnetic heads 5a and 5b. The rotary head has a reference surface 7 provided on the rotary cylinder 2. A vertical position detector element 8 of the eddy current type for detecting the vertical position of the detection objects 6a and 6b and that of the reference surface 7 is disposed above the rotary head 2 and is fixed by a support member (not shown) mounted on a frame of the magnetic recording and reproducing apparatus. The rotary head further comprises a rotary transformer 9 and a slip ring 10 for supplying electric power to the movable elements 4a and 4b.

As shown in FIG. 2, a magnetic tape 11 is brought into contact with and travels along the periphery of the rotary cylinder 2 and that of the fixed cylinder 3. The magnetic heads 5a and 5b have different azimuth angles for recording signals on the magnetic tape 11.

The vertical position detector element 8 is located on the side opposite to the magnetic tape 11. The reason for this is that the magnetic heads 5a and 5b do not undergo much influence from magnetism of the vertical position detector element 8 during recording or reproduction.

Figure 3:
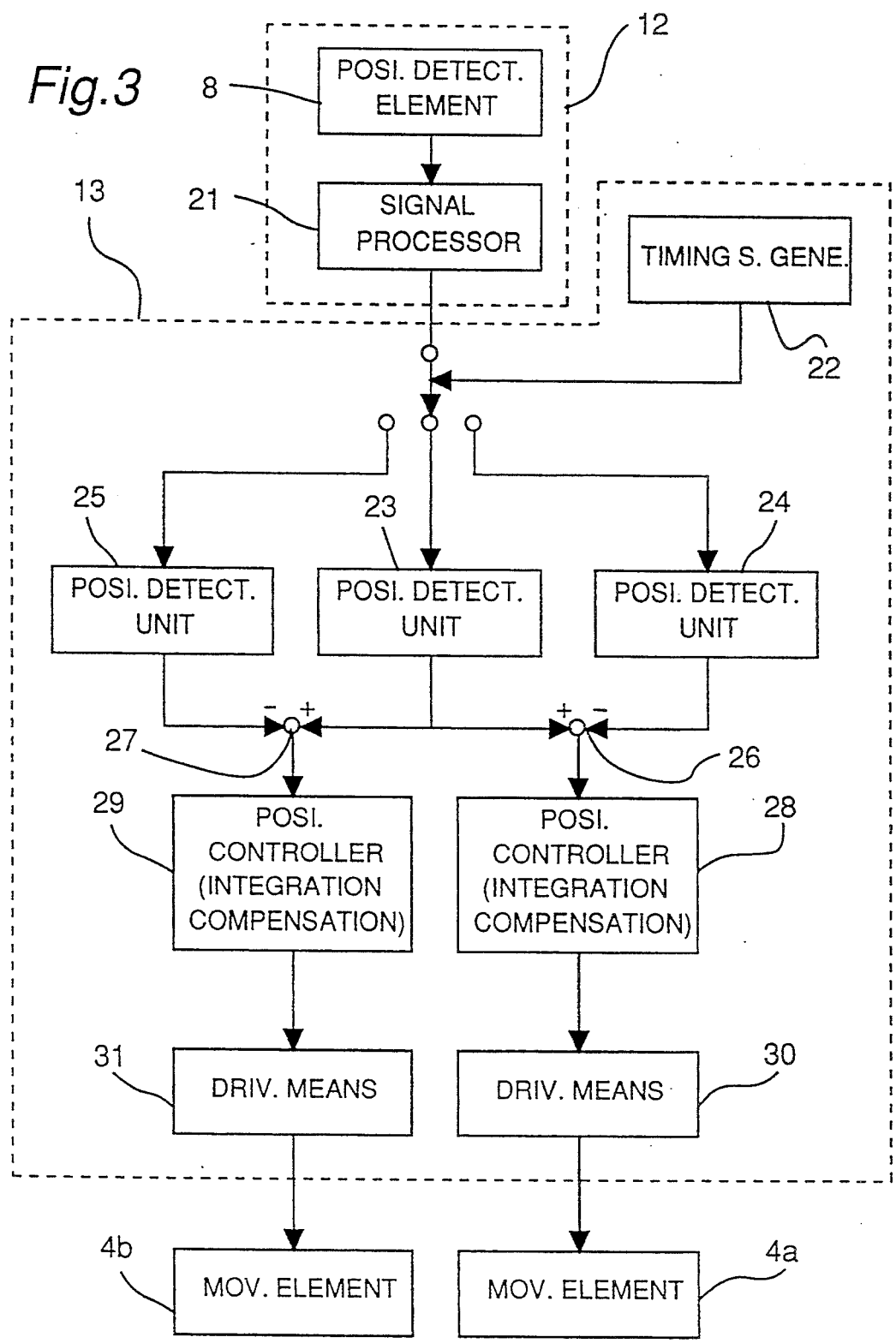
FIG. 3 is a block diagram of a control system for controlling the rotary head of FIG. 1.

FIG. 3 is a block diagram indicative of a vertical position detector means 12 and a control means 13. The vertical position detector means 12 comprises the vertical position detector element 8 and a signal processor 21. A signal detected by the vertical position detector element 8 is inputted into the signal processor 21 and is outputted therefrom as a vertical position detector signal. The signal processor 21 performs processings, for example amplification and/or straight line correction, with respect to the signal outputted from the vertical position detector element 8.

A signal outputted from the vertical position detector means 12 is selectively inputted into any one of three position detector units 23, 24, and 25 for the reference surface 7 and the detection objects 6a and 6b, respectively. The connection between an output terminal of the vertical position detector means 12 and input terminals of the vertical position detector units 23, 24, and 25 is switched by a timing signal generator 22. When the reference surface 7 passes below the vertical position detector element 8, the position detector unit 23 for the reference surface 7 is selected and stores the vertical position detector signal at that time as a vertical reference position. Likewise, when the detection objects 6a and 6b pass below the vertical position detector element 8, the vertical position detector units 24 and 25 are selected in turn and store respective vertical position detector signals. An output of the vertical position detector unit 23 for the reference surface 7 is inputted into two subtracters 26 and 27 by which outputs of the vertical position detector units 24 and 25 for the detection objects 6a and 6b are subtracted therefrom for calculation of respective vertical positional errors, which are in turn inputted into respective vertical position controllers 28 and 29.

Based upon the vertical positional error signals, the vertical position controllers 28 and 29 generate respective control signals and drive the movable elements 4a and 4b using drive means 30 and 31 to control the vertical position of the magnetic heads 5a and 5b, respectively.

As is clear from the above, the control means 13 comprises the timing signal generator 22, the vertical position detector unit 23 for the reference surface 7, the vertical position detector units 24 and 25 for the detection objects 6a and 6b, the vertical position controllers 28 and 29, and the drive means 30 and 31.

Figure 4:
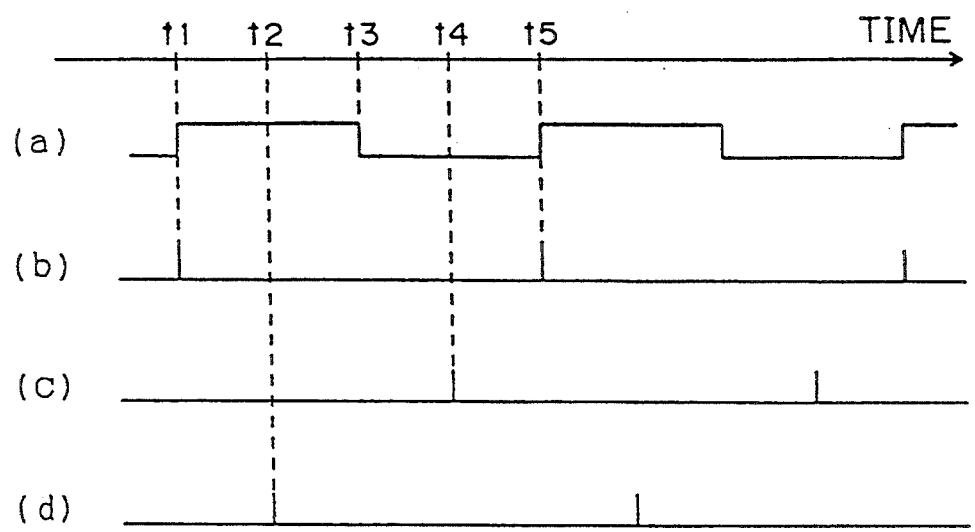
FIG. 4 is a time chart indicative of the operation of the rotary head of FIG. 1.

FIG. 4 is a time chart indicative of the timing for detecting the vertical position of the reference surface 7 and that of the detection objects 6a and 6b by the use of the vertical position detector element 8.

The waveform of a signal (a) is used for switching the magnetic heads 5a and 5b. The waveform of a signal (b) indicates sampling points for detecting the vertical position of the reference surface 7. The waveform of a signal (c) indicates sampling points for detecting the vertical position of the detection object 6a whereas that of a signal (d) indicates sampling points for detecting the vertical position of the detection object 6b.

The rotary head having the above-described construction operates as follows.

In FIG. 2, since the rotary cylinder 2 rotates counterclockwise, the reference surface 7 and the detection objects 6b and 6a pass in this order below the vertical position detector element 8 fixed to a frame by a support member. When the reference surface 7 has passed below the vertical position detector element 8, the vertical position detector element 8 detects the position of the vertical reference surface 7. Then, the signal processor 21 processes an output from the vertical position detector element 8 and outputs a vertical position detector signal.

As shown in FIG. 4, since the timing signal generator 22 can recognize the vertical position detector signal at a time t1 as being a vertical position detector signal for the reference surface 8 based upon the time elapsed after the receipt of a head switching signal, an output of the signal processor 21 is inputted into the vertical position detector unit 23 for the reference surface 7. Likewise, upon rotation of the rotary cylinder 2, when the detection objects 6a and 6b have passed below the vertical position detector element 8, i.e., at times t4 and t2 shown in FIG. 4, the vertical position detection for the detection objects 6a and 6b is performed, and outputs of the signal processor 21 are inputted into the vertical position detector units 24 and 25, respectively.

Detection values stored in the vertical position detector units 24 and 25 are subtracted from a detection value stored in the vertical position detector 23 by the subtracters 26 and 27, respectively, and subtraction results are inputted as vertical positional error signals into the vertical position controllers 28 and 29.

The vertical position controllers 28 and 29 generate respective control signals required to control the movable elements 4a and 4b using the drive means 30 and 31, respectively, so that the detection objects 6a and 6b, i.e., the magnetic heads 5a and 5b may properly be positioned with respect to the reference surface 7.

It is to be noted here that the vertical position controllers 28 and 29 are required to perform only the home position control and have respective integration compensating elements or characteristics to achieve highly accurate vertical positioning without any offset.

Preferably, the vertical position control operation for the magnetic heads 5a and 5b terminates until signal recording is initiated with respect to the magnetic tape 11. More specifically, after the vertical position of the reference surface 7 is detected at a time t1 and that of the detection object 6a is detected at a time t4, the vertical position control operation is required to terminate by a time t5 from which subsequent recording is initiated by the magnetic head 5a. In this case, correction in the position of the magnetic head 5a by the positional signals sampled at the times t1 and t4 completes by the subsequent recording.

Similarly, with respect to the vertical position detection for the reference surface 7 to be performed at the time t1 and that for the detection object 6b to be performed at the time t2, the vertical position control operation terminates by a time t3 from which subsequent recording is initiated by the magnetic head 5b. In this case, correction in the vertical position of the magnetic head 5b by the positional signals sampled at the times t1 and t2 completed by the subsequent recording.

In other words, after the vertical position of the magnetic heads 5a and 5b have been detected, the vertical position control operation is terminated within a period equal to a quarter of a head switching period so that the correction in the vertical position of the magnetic heads 5a and 5b may be performed before the signal recording is initiated with respect to the magnetic tape 11.

Based upon the the position detector signals of the reference surface 7 and the detection objects 6a and 6b, the the position control is performed so that the magnetic heads 5a and 5b may be properly positioned relative to the reference surface 7. To this end, it is necessary to adjust the vertical positional deviation between the reference surface 7 and the detection objects 6a and 6b in advance. This adjustment can be performed in a manner as similar to that for a fixed magnetic head. Although a spacer is generally used in the height adjustment for the fixed magnetic head, it is only necessary, in the height adjustment for a magnetic head mounted on a movable element, to store in the control means 13 a vertical positional error signal or driving signal for moving the magnetic head by a certain length required for the adjustment..It is, therefore, very easy to electrically perform the height adjustment for the magnetic heads 5a and 5b.

As shown in the block diagram of FIG. 3, the vertical position detector means 12 consists of a single vertical position detector element 8 and a single signal processor 21. Accordingly, it is possible to perform the vertical position detection with accuracy without causing any dispersion in the vertical position detector element 8 and the signal processor 21.

As described above, according to the present invention, since the difference between the vertical position of reference surface 7 and that of the detection objects 6a and 6b is always detected, the vertical position detection for the magnetic heads 5a and 5b can be performed with high accuracy under little influence of drift of the vertical position detector means 12.

Figure 5:
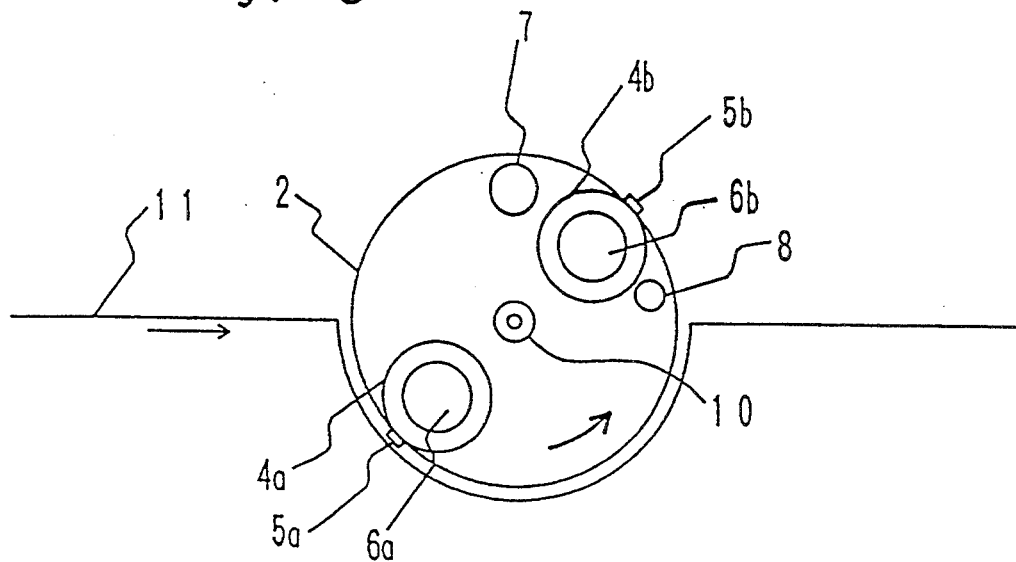
FIG. 5 is a view similar to FIG. 2, according to a second embodiment of the present invention.

FIG. 5 depicts a rotary head according to a second embodiment of the present invention, in which the vertical position detector element 8 fixed by a support member carried by a frame is disposed in the proximity of the location (hereinafter referred to as a separation point) where the magnetic tape 11 breaks contact with the rotary cylinder 2 and the fixed cylinder 3. Furthermore, in the first embodiment, the reference surface 7 is located the same distance apart from both the movable elements 4a and 4b whereas, in the second embodiment, the reference surface 7 is located closer to the movable element 4b to which the magnetic head 5b is secured than to the movable element 4a.

Figure 6:
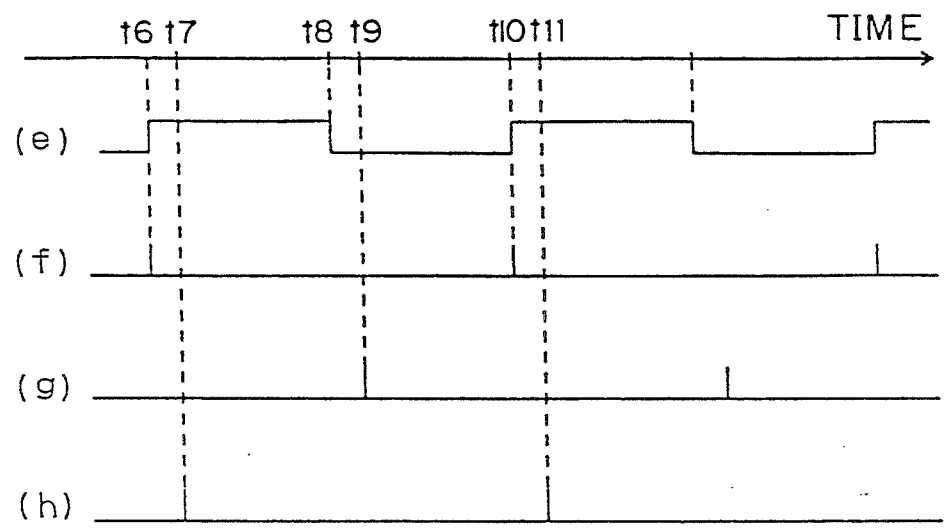
FIG. 6 is a time chart indicative of the operation of the rotary head of FIG. 5.

FIG. 6 is a time chart indicative of the timing for detecting the vertical position of the reference surface 7 and that of the detection objects 6a and 6b by the use of the vertical position detector element 8.

In a manner similar to the time chart of FIG. 4, the waveform of a signal (e) is used for switching the magnetic heads 5a and 5b. The waveform of a signal (f) indicates sampling points for detecting the vertical position of the reference surface 7. The waveform of a signal (g) indicates sampling points for detecting the vertical position of the detection object 6a whereas that of a signal (h) indicates sampling points for detecting the vertical position of the detection object 6b.

Comparing the time chart of FIG. 6 with that of FIG. 4, it can be known that the timing for detecting the position vertical of the detection objects 6a and 6b mounted on the movable elements 4a and 4b must to be made earlier in the former than in the latter. The reason for this is that the sampling of the vertical position detector signals must be performed earlier by a period of time corresponding to a length of shift of the vertical position detector element 8 from the central portion on the side opposite to the magnetic tape 11 towards the separation point of the magnetic tape 11. Accordingly, times t9 and t7 in the time chart of FIG. 6 are ahead of times t4 and t2 in that of FIG. 4. For example, when the position detector element 8 is disposed 30° apart from the separation point of the magnetic tape 11, it is necessary to perform the sampling 60° earlier than the position of FIG. 4, and therefore, the sampling is advanced by one-sixth of a head switching period.

On the other hand, it is necessary to shift the timing for detecting the vertical position of the reference surface 7 by a period of time corresponding to the sum of a length of shift of the reference surface 7 towards the movable element 4b and a length of shift of the vertical position detector element 8 towards the separation point of the magnetic tape 11. For example, when the vertical position detector element 8 is disposed 30° apart from the separation point of the magnetic tape 11 and the reference surface 7 is disposed 30° apart from the movable element 4b, it is necessary to advance the sampling 60° due to the shift of the vertical position detector element 8 and to delay it 60° due to the shift of the reference surface 7. As a result, since the deviation in the sampling time becomes 0° in total, the timing for sampling the reference surface 7 becomes that indicated in FIG. 4.

By positioning vertical making the position detector element 8 close to the magnetic tape 11, the period of time within which the vertical position control is performed and should be settled can be prolonged. When the position of the reference surface 7 is detected at a time t6, such a period can be prolonged by one-sixth of a head switching period as compared with the first embodiment, for example, from t9 to t10 in the case of the movable element 4a and from t7 to t8 in the case of the movable element 4b. Furthermore, by making the location of the reference surface 7 close to the movable element 4a, the detection value in the vertical position of the reference surface 7 can be immediately used for the vertical position control of the movable element 4b, thereby enabling the correct control without much time lag.

Figure 7:
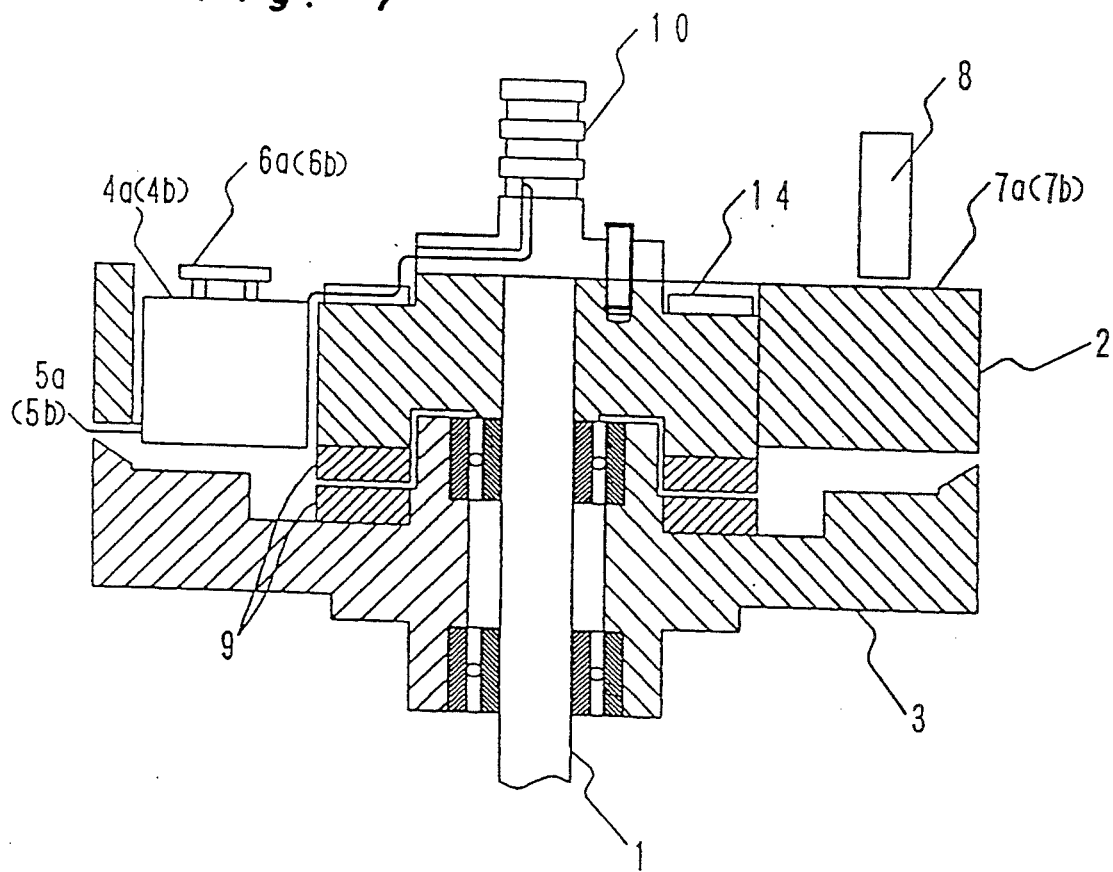
FIG. 7 is a view similar to FIG. 1, according to a third embodiment of the present invention.

FIG. 7 depicts a rotary head according to a third embodiment of the present invention.

The rotary head of FIG. 7 is substantially the same in construction as that of FIG. 1 except that, in She former, part of the upper surface of the rotary cylinder 2 is used as reference surfaces 7a and 7b and a wiring board 14 is accommodated in a recess formed at the upper surface of the rotary cylinder 2 except the reference surface 7.

Figure 8:
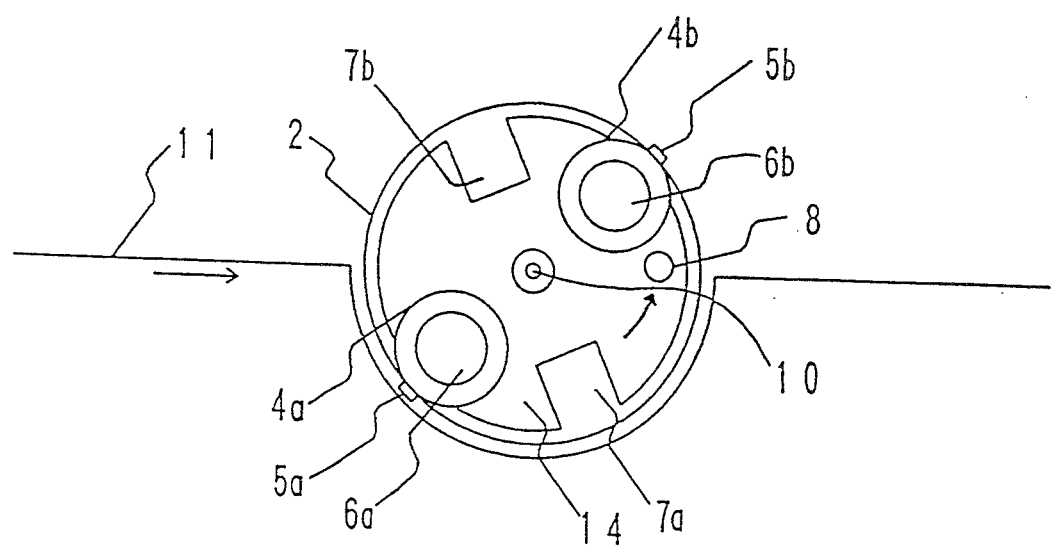
FIG. 8 is a view similar to Fig.

As shown in FIG. 8, the two reference surfaces 7a and 7b are in a symmetric relationship with respect to the rotary shaft 1, and also, the recess accommodating the wiring board 14 is symmetrically formed with respect to the rotary shaft 1.

The operation of the rotary head according to this embodiment is substantially the same as that of the rotary head according to the first embodiment. In this embodiment, however, only one of the two reference surfaces 7a and 7b is used as the vertical reference position and the other one of the reference surfaces 7a and 7b is not used in the vertical position detector means 12 and the control means 13.

The integral formation of the reference surfaces 7a and 7b with the rotary cylinder 2 can enhance the accuracy of the reference surfaces 7a and 7b and reduce the number of parts.

Furthermore, since the wiring board 14 is accommodated in the recess formed at the upper surface of the rotary cylinder 2, the wiring between the movable elements 4a and 4b and the slip ring 10 can be performed at a location lower than the reference surfaces 7a and 7b, thereby making it possible to prevent wires from twining around or being caught by the vertical position detector element 8.

The symmetric arrangement of the reference surfaces 7a and 7b with respect to the rotary shaft 1 can improve the balance of the rotary cylinder 2 and thus contributes to smooth rotation of the rotary cylinder 2. However, the number of reference surfaces is not limited to two but may be any number more than two on the condition that the balance of the rotary cylinder is maintained.

In addition, since both the reference surfaces 7a and 7b are not used as the reference position to be detected by the vertical position detector element 8, the vertical position detection can be performed without taking account of positional deviation between the reference surfaces 7a and 7b due to periodical whirling or poor machining of the rotary cylinder 2.

Figure 9:
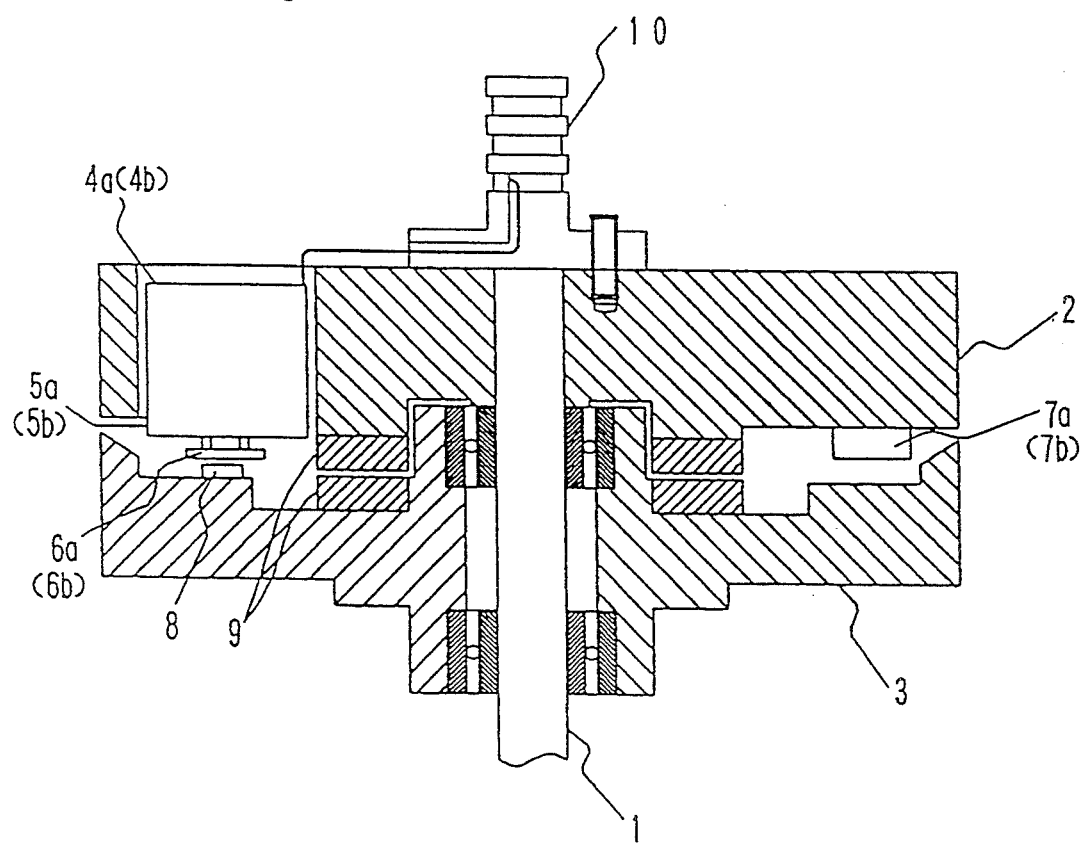
FIG. 9 is a view similar to FIG. 1, according to a fourth embodiment of the present invention.

FIG. 9 depicts a rotary head according to a fourth embodiment of the present invention.

The rotary head of FIG. 9 is substantially the same in construction as that of FIG. 1 except that, in the former, the reference surfaces 7a and 7b are provided on the lower surface of the rotary cylinder 2 and the detection objects 6a and 6b mounted on respective movable elements 4a and 4b are opposed to the fixed cylinder 3 to which the vertical position detector element 8 is secured.

The relationship in the arrangement of the reference surfaces 7a and 7b, the movable elements 4a and 4b, and the vertical position detector element 8 on the cylinders 2 and 3 may be the same as that of the first or second embodiment.

In this embodiment, since the vertical position detector element 8 is secured to and accommodated in the fixed cylinder 3, it is not necessary to fix the vertical position detector element 8 by the use of a support member carried by a frame, thereby facilitating the handling of the cylinders 2 and 3. Moreover, since the detection objects 6a and 6b are mounted on the rotary cylinder 2 so as to confront the fixed cylinder 3, the operator cannot directly touch the detection objects 6a and 6b and the vertical position detector element 8. Accordingly, there is no possibility of operating points shifting after adjustment.

It is to be noted here that although an eddy current type position detector element is employed in the above-described embodiments, other vertical position detector elements of the electrostatic capacity type or optical type may also be employed.

It is also to be noted that the timing signal generator is merely required to generate signals capable of delaying head switching signals and can be composed of three monostable multivibrators. Alternatively, the timing signal generator may comprise a timer if a microcomputer is employed.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A rotary head for use in a magnetic recording and reproducing apparatus comprising:
   a fixed cylinder:
   a rotary cylinder opposed to said fixed cylinder;
   two electrically controllable movable elements mounted on said rotary cylinder so as to be about 180° apart from each other;
   at least two magnetic heads respectively secured to said two movable elements;
   at least one reference surface provided on said rotary cylinder;
   only one vertical position detector means, spaced apart from said rotary cylinder, for detecting vertical positions of said movable elements and a vertical position of said reference surface once for each rotation of said rotary cylinder;
   a control means for controlling said movable elements in response to an output from said vertical position detector means so that said magnetic heads are located at a predetermined vertical position with respect to the vertical position of said reference surface.

2. The rotary head according to claim 1, wherein said magnetic heads have different azimuth angles.

3. The rotary head according to claim 1, wherein said control means includes an integration compensating means when signals are recorded on a magnetic tape.

4. The rotary head according to claim 1, wherein said vertical position detector means comprises a single vertical position detector element and a single signal processor.

5. The rotary head according to claim 4, wherein said position vertical detector element is located on a side opposite to the side on which a magnetic tape is brought into contact with said fixed and rotary cylinders.

6. The rotary head according to claim 5, wherein said position vertical detector element is disposed close to a location where the magnetic tape leaves said cylinders.

7. The rotary head according to claim 1, wherein said reference surface is provided upstream from a center line between said movable elements in a direction of rotation of said rotary cylinder.

8. The rotary head according to claim 1, wherein said reference surface is integrally formed with said rotary cylinder. .

9. The rotary head according to claim 1, wherein said rotary cylinder has a plurality of reference surfaces.

10. The rotary head according to claim 9, wherein only one of the plurality of reference surfaces is used as a reference point detected by said position detector means.

11. The rotary head according to claim 1, wherein said vertical position detector means comprises a vertical position detector element opposed to the upper surface of said rotary cylinder and wherein part of the upper surface of said rotary cylinder is used as said reference surface.

12. The rotary head according to claim 11, further comprising a wiring board accommodated in a recess formed at an upper portion of said rotary cylinder.

13. The rotary head according to claim 1, wherein said vertical position detector means comprises a vertical position detector element mounted on said fixed cylinder and wherein part of that surface of said rotary cylinder that confronts said fixed cylinder is used as said reference surface.

* * * * *